United States Patent Office 3,220,187
Patented Nov. 30, 1965

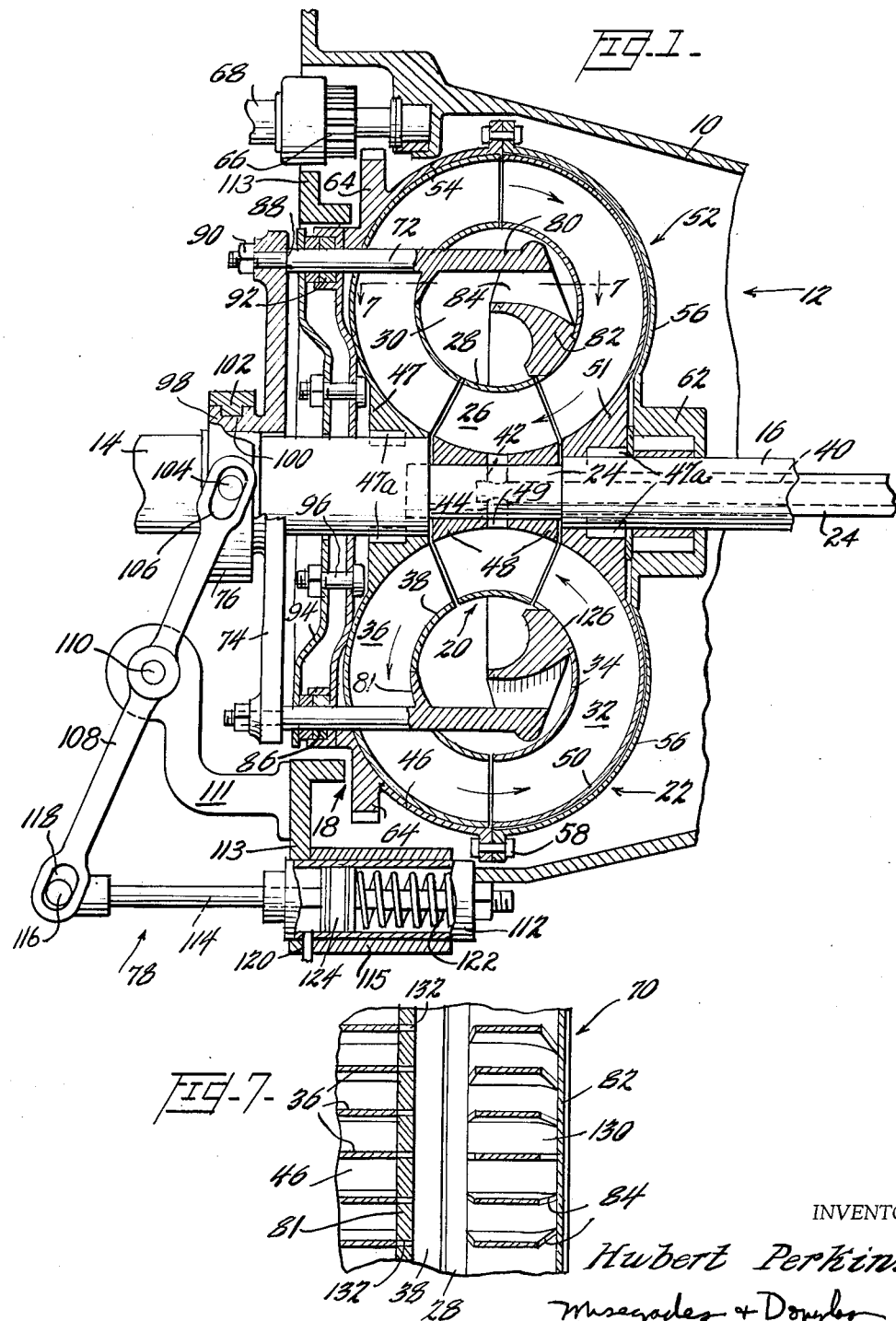

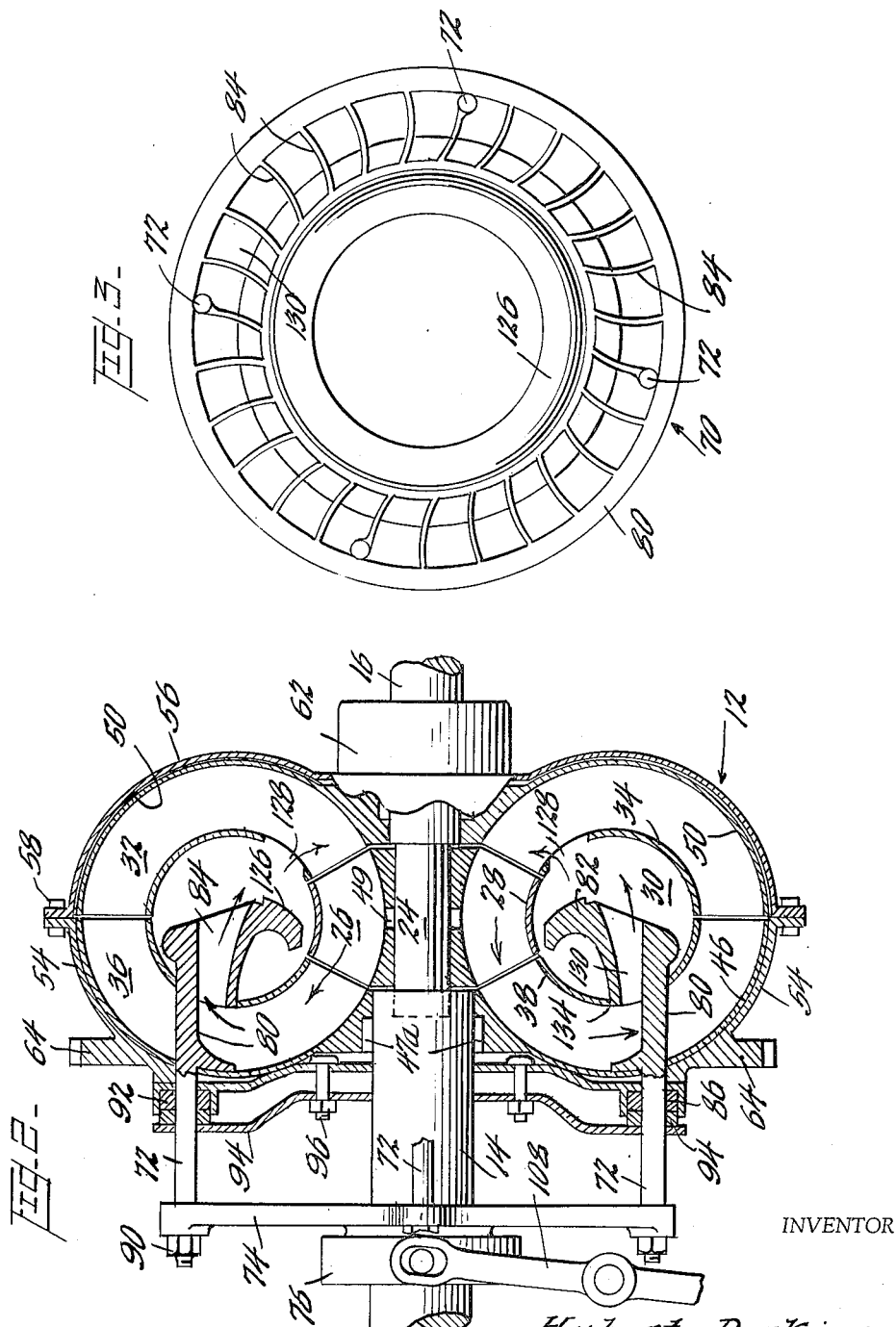

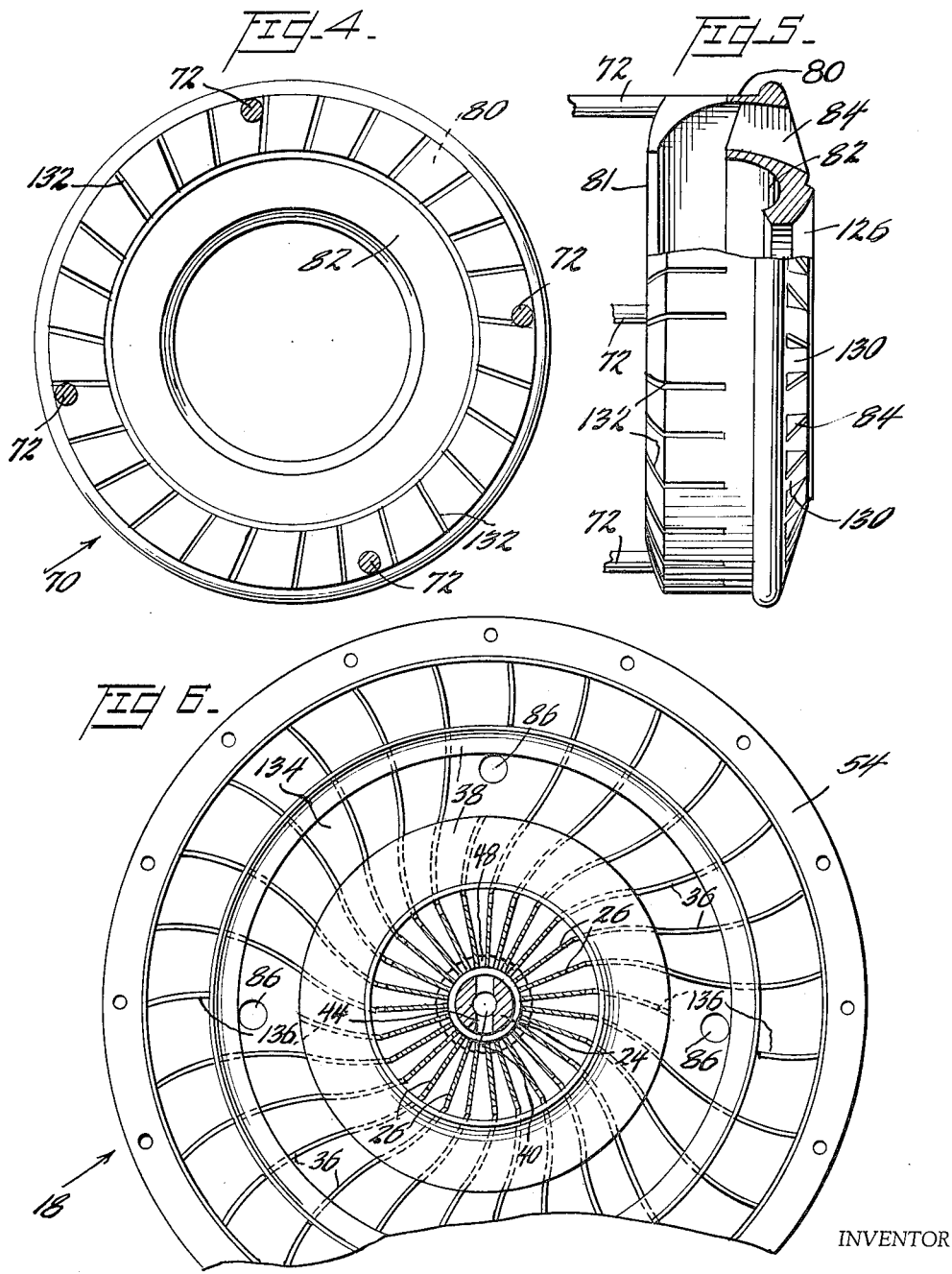

3,220,187
FLUID DRIVE AUTOMATIC TRANSMISSION
Hubert Perkins, 2923 Heyward St., Columbia, S.C.
Filed Dec. 9, 1964, Ser. No. 417,036
12 Claims. (Cl. 60—54)

This invention relates to a fluid drive for hydraulic couplings, and in particular to mechanical control means for a fluid coupling.

In its most common form, the invention is most applicable to automatic transmissions for automobiles or like vehicles. The specific transmission referred to is of the hydraulic type employing a fluid coupling, or hydrokinetic torque converter, for transmission of power from the automobile engine to the primary transmission. The recent development of the fluid coupling in this capacity has proven to be highly desirable in that this type of coupling permits a smoother flow of force through the power train of an automobile or like vehicle, thereby ensuring greater efficiency of the vehicle as well as increased driver and passenger comfort.

In its simplest form, the above type of hydraulic coupling comprises an impeller, stator and turbine assembly defining a closed, toroidal chamber, for a working fluid. The unit is located concentrically with respect to the primary power shaft of the engine as well as a secondary shaft which transmits power from the coupling to the transmission proper. In addition, some sort of means is provided to engage and disengage the coupling, and the present invention is directed to this means.

Control means for fluid couplings available in the art include a variable pitch pump blade assembly and various types of auxiliary pumps to add or remove oil from the working chamber of the coupling as desired. These two basic control mechanisms possess several inherent disadvantages. A variable pitch blade assembly requires extremely precise machining of each blade element in order to prevent turbulent fluid flow within the coupling which would induce damage to the mechanism. Additionally, each blade has to be pivotally mounted in the casing about the turbine pump thereby presenting at least one leak point in the pump casing for each blade in the pump. Needless to say, overcoming these disadvantages presents a prohibitive cost of manufacture. The second or alternative type of control means above discussed is relatively simpler in construction than the first, but requires that the fluid chamber be emptied and filled each time the coupling is disengaged or engaged. The time lapse involved in filling and draining the working fluid cavity may seriously impair the overall efficiency of the entire vehicle.

The present invention overcomes the above disadvantages by providing a control mechanism for a fluid coupling assembly that is interfitted within the blades of the pump element and is provided with external means for inserting the invention into the working fluid cavity of a fluid coupling, thereby deflecting the flow of fluid from the turbine element of the coupling. Means are also provided for withdrawing the control mechanism from the working fluid cavity into the core of the coupling, thereby permitting the coupling to operate.

It is therefore the primary object of this invention to provide a control mechanism for a fluid coupling which is adapted to interrupt the normal fluid flow within said coupling, thereby rendering said coupling temporarily inoperable.

It is another object of this invention to provide a control mechanism for a fluid coupling which is instantaneous in operation.

It is yet another object of the invention to provide a control mechanism for a fluid coupling which may be adapted to any ordinary fluid coupling.

Finally, it is an object of this invention to provide a control mechanism for a fluid coupling which is simple in construction and mode of operation, and thereby low in cost of manufacture.

These and other objects of the present invention will become more fully apparent by reference to the following specification and drawings in which:

FIG. 1 is an elevational view of the invention in partial section, showing the invention in inoperative position;

FIG. 2 is a view similar to FIG. 1 reduced in scale, but showing the invention in operative position;

FIG. 3 is a full front face view of the invention alone;

FIG. 4 is a full rear view of the invention alone;

FIG. 5 is an elevational partial section of the invention;

FIG. 6 is a front face view of an impeller assembly adapted to receive the invention;

FIG. 7 is a partial section, drawn to an enlarged scale and taken along lines 7—7 of FIG. 1.

Referring now to the drawings by reference character, and particularly to FIG. 1 thereof, there is shown a portion of a transmission casing 10 enclosing fluid coupling 12 at the forward end thereof. The engine of a vehicle (not shown) transmits power by drive shaft 14 through fluid coupling 12 and then to a secondary drive shaft 16 which is secured to the transmission of the vehicle (not shown).

In its simplest form, the fluid coupling comprises an impeller 18, stator or reactor unit 20, and turbine unit 22. Each of these units comprises a plurality of blade elements arranged axially about drive shaft 14, stationary stator shaft 24, and secondary drive shaft 16, respectively. Stator blades 26 of stator 20 are fitted with an inner shell 28. Similarly, turbine blades 32 of turbine unit 22 are fitted with an inner shell 34, and pump blade 36 of pump 18 are fitted with an inner shell 38. These three inner shells 28, 34 and 38, cooperate to form annular hollow core 30 of the fluid coupling 12. These inner shells taken together with the outer casing of the impeller, stator and turbine blade assemblies, form a toroidal working chamber for the fluid coupling, so that fluid is forced by impeller blades 36 against turbine blades 32 where the fluid is deflected so as to pass to stator blades 26, thus completing the fluid coupling as indicated by the arrows in FIG. 1. The fluid for the system is introduced in the standard manner, through bore 40 and inlet ports 42 and 44 of stationary stator shaft 24.

The exterior of the toroidal working chamber is defined by a set of annular casings 46, 48 and 50, secured about impeller blades 36, stator blades 26, and turbine blades 32 respectively. Outer casing 48 is secured to stator shaft 24 and is further provided with an annular opening 49 therethrough to permit entry of working fluid into the toroidal chamber from inlet ports 42. Casings 46 and 50 are similar in construction, having central hubs 47 and 51, respectively, which are removably secured to shafts 14 and 16 in the conventional manner, as by keys or splines 47a.

The entire assembly, as explained so far, is contained within a supporting chamber 52 comprising shell 54, rigidly secured to casing 46 as by welding, and a second shell 56, as an extension of casing 46, surrounding casing 50 and bolted to shell 54 by a series of circumferentially spaced bolts 58, whereby other suitable, rigid means, so as to overlie turbine 22 and enclose fluid coupling 12. Shell 54 may be secured to shaft 14 by a series of keys or splines (not shown) for further structural rigidity. Conversely, shell 56 is spaced from casing 50 and is rotatable about secondary drive shaft 16 by means of a roller bearing assembly 62.

In addition, shell 54 may be supplied with a starter gear ring 64 which is releasably engageable with a starter drive wheel 66 mounted on a shaft 68 from the starter of the vehicle (not shown).

Referring now to FIGS. 1 and 5 in particular, the invention will be more particularly discussed.

The invention, which may be designated as a fluid diverter mechanism, comprises fluid diverter assembly 70, supports rods 72, adjustment disc 74, control ring 76, and activating mechanism 78. Diverter mechanism 70 comprises a pair of annular rings 80 and 82 joined together by a plurality of flat blade elements 84 inserted therebetween and having their working faces arranged generally parallel with the axis of rotation of shafts 14 and 16. Support rods 72 are circumferentially spaced about the outer surface of ring 80 and firmly secured thereto, as by welding. Rods 72 then extend outwardly through shell 54 through reinforced bores 86 therein. The outer terminus of each rod 72 is reduced in diameter so as to form shoulder 88 which serves as an abutment for adjustment disc 74 which is placed thereon. The reduced outer end of support rods 72 are threaded so as to receive nuts 90 which securely lock disc 74 in place. An oil or fluid seal is formed about the exposed portion of bores 86 in shell 54 by a packing element 92 which is pressed in place by a sealing disc 94, interposed between disc 74 and shell 54 and adjustably secured to shell 54 by a number of circumferentially spaced nut and bolt assemblies 96. Control disc 74 is formed with an outer annular extension 98 which is grooved at 100 for receiving control ring 76 which is slidably received thereon by a mating extension 102 which fits in groove 100. Control ring 76 has a radially extending pin 104 thereon which is slidably received in recess 106 formed in rocker arm 108 of activating assembly 78. Rocker arm 108 is rotatable about mounting 110 which includes a bracket 111 secured to a mounting plate 113, which is an integral portion of the forward end of transmission casing 10. The remaining portions of activating assembly 78 include an hydraulic cylinder 112 and operative arm 114, a cylindrical jacket 115, attached to the lower, forward end of casing 10, serves as a mounting for cylinder 112. The end of arm 114 has a pin 116 thereon which is received in recess 118 of rocker arm 108 and serves the same purpose as pin 104 and recess 106 discussed above. Hydraulic cylinder 112 includes nipple 120 for receiving fluid under pressure, and return spring 122 which is located rearwardly of activating piston 124. It is evident from the above discussion that activating mechanism 78 may comprise a mechanical or electrical device, or any other construction suitable for operating the invention.

A better exposition of the exact construction of diverter mechanism 70 may be had by reference to FIGS. 3 through 5. These figures show inner ring 82 having an inner, arcuate extension, so as to form an annular valve face portion 126 which is adapted to cooperate with an annular valve seat 128 in ring 34 of turbine assembly 22 as will be explained below. FIG. 3 discloses the planar relationship of valve face 126 with respect to blades 84 and outer ring 80. Blades 84 form a plurality of passageways 130 for the flow of working fluid therethrough. FIGS. 4 and 5 show outer ring 80 having a plurality of slits 132 in the rear half thereof. These slits are adapted to be aligned with blades 36 of impeller 18, when diverter mechanism 70 is drawn into impeller 18 as shown in FIG. 2. Shell 38 of impeller 18 also has an annular valve seat 134 for receiving the segmented rear valve face 81 of outer ring 80. FIG. 6 indicates annular valve seat 134, as well as bores 86 and segmented impeller vanes 136 which permit passage of support rods 72 through the impeller 18. Sectional view, FIG. 7, discloses slits 132 properly aligned with impeller blades 36.

Turning now to FIGS. 1 and 2 in particular, the operation of the device will be explained. FIG. 1 indicates the invention in non-operating position, with diverter mechanism 70 enclosed entirely within core 30 of fluid coupling 12. In this position valve face 126 of ring 82 is located in sliding engagement with shell 34, while the rear valve face 81 of outer ring 80 is located in annular opening 134 of ring 36, thereby permitting the fluid coupling to operate as fluid flows unobstructed from impeller 18 to turbine 22 through stator 20 and back to impeller 18 against. To activate diverter mechanism 70, hydraulic cylinder 112 is charged with an inflow of fluid through nipple 120. In the preferred embodiment of the invention, hydraulic cylinder 112 would be connected to the master cylinder of the brake assembly of a vehicle (not shown) and thus would be activated by the braking of the vehicle. Thus arm 114 is drawn into cylinder 112 thereby rotating rocker arm 108 counter-clockwise about mounting 110. Control ring 76 acting on disc 74 through extension 98 exerts a pulling force on support rods 72, thereby drawing diverter mechanism 70 into the position shown in FIG. 2 of the drawings. Valve face 81 of outer ring 80 is withdrawn entirely into impeller 18, thereby interrupting the flow of fluid through the fluid coupling 12. Thus, the working fluid is forced, by rings 80 and 82 acting as baffles, through passageways 130 into core 30 of the fluid coupling 12. At the same time, valve face 126 of inner ring 82 is withdrawn thereby exposing annular valve seat 128 so that fluid flows from core 30 into the outlet portion of turbine 22 and then through stator 20 back to impeller 18, as indicated by the arrows in FIG. 2. Thus the flow of working fluid through the coupling is short circuited as a major portion of the turbine is by-passed by the fluid, thereby reducing the drive of the turbine proportionally. To activate the coupling once again, it is only necessary to relieve the brakes of the vehicle. This will permit the outflow of fluid through nipple 120 of hydraulic cylinder 112 allowing rocker arm 108 to rotate clockwise about mounting 110 and thus returning the diverter mechanism 70 to the position shown in FIG. 1 of the drawings.

It can be seen from the foregoing that I have invented a new and useful control mechanism for fluid couplings, and therefore I am not to be limited to the exact construction provided herein, except as may be deemed limited by the scope of the following claims.

I claim:

1. In a fluid coupling including semitoroidal bladed impeller, turbine and reactor rotors, and exterior and interior shell means on each of said rotors defining a toroidal fluid circuit about a hollow, annular core, said bladed turbine being driven by fluid pressure supplied from said impeller, and said reactor rotor being disposed between the radially inward ends of said impeller and turbine rotors, fluid diverter means for interrupting said fluid circuit to reduce the drive of said turbine, located within said core in inoperative position, comprising radially spaced inner and outer baffle rings and a plurality of radial blades between said rings securing the rings together, a portion of said outer ring being arranged for movement into said impeller to interrupt said fluid circuit, said inner ring and said plurality of blades being arranged to cooperate with said outer ring to direct the toroidal circuit fluid to the core of the fluid coupling, thereby substantially reducing the supply of fluid pressure to said turbine.

2. The device of claim 1 wherein said portion of the outer ring is formed and arranged to enter said impeller at a point midway of the radially inward and outward ends thereof to interrupt said fluid circuit at the median pressure point within said impeller so that sufficient pressure exists within the interrupted fluid circuit to force the circuit fluid into said core, between said rings, without driving said turbine.

3. The device of claim 1 wherein said portion of the outer ring comprises a plurality of segmented vane elements adapted to tightly interfit with the blades and exterior shell of said impeller so as to divert said fluid circuit completely into said core, away from the portion of said impeller radially outward of said outer ring.

4. The device of claim 1 wherein said plurality of blades securing the rings together are arranged to abut the blades of said impeller in a coplanar, fluid-tight relationship upon movement of said portion of the outer ring into said impeller.

5. In a fluid coupling including semitoroidal bladed impeller, turbine, and reactor rotors, and exterior and interior shell means on each of said rotors defining a toroidal fluid circuit about a hollow, annular core, said bladed turbine being driven by fluid pressure supplied from said impeller, and said reactor rotor being disposed between the radially inward ends of said impeller and turbine rotors, fluid diverting means for interrupting said fluid circuit to reduce the drive of said turbine, located within said core in inoperative position, comprising radially spaced inner and outer baffle rings, a plurality of radial blades between said rings securing the rings together, a first valve comprising a first annular valve face on said outer ring and an adjacent first annular valve seat on the inner shell of said impeller, a second valve including a second annular valve face on said inner ring and an adjacent second annular valve seat on the inner shell of said turbine, a portion of said outer ring being arranged for movement into said impeller to interrupt said fluid circuit, said movement causing both said valves to open, said rings and plurality of blades being arranged to divert circuit fluid from said first valve between said rings to said core and to said second open valve, thereby substantially reducing the drive of said turbine.

6. The device of claim 5 wherein said first annular valve seat is located at a point midway of the radially inward and outward ends of said impeller and said first annular valve face is located on the axial end of said portion of said outer ring, said first valve face and said portion of the outer ring being segmented to tightly interfit with the exterior shell and blades of said impeller, respectively, when said fluid diverter is in operative position, said blades of the impeller abutting said segmented first valve face in fluid seal relationship when said fluid diverter is in inoperative position.

7. The device of claim 5 wherein said second annular valve seat is located adjacent the radially inward end of the interior shell of said turbine so that upon movement of said fluid diverter to operative position, the circuit fluid is directed through said second open valve from said core to the radially inward output end of said turbine and thus by-passing the major portion of said turbine and substantially reducing the drive thereof.

8. The device of claim 5 wherein the radial end of said inner ring, axially opposite said second annular valve face, is arranged to abut the interior shell of said impeller, adjacent the radially inward annular end of said first valve seat, in fluid seal relationship, and said plurality of blades are arranged to abut the blades of said impeller, in fluid seal relationship, coplanar therewith, when said fluid diverter is in operative position.

9. In a fluid coupling including semitoroidal bladed impeller, turbine, and reactor rotors, and exterior and interior shell means on each of said rotors defining a toroidal fluid circuit about a hollow, annular core, said bladed turbine being driven by fluid pressure supplied from said impeller and said reactor rotor being disposed between the radially inward ends of said impeller and turbine rotors, fluid diverting means for interrupting said fluid circuit to reduce the drive of said turbine, located within said core in inoperative position, comprising radially spaced inner and outer baffle rings, a plurality of radial blades between said rings connecting the rings together, means for moving said fluid diverter into operative position, said moving means comprising at least two radially spaced rods secured to said outer ring and mounted through said impeller, and control means at the free ends of said rods for initiating said movement whereby said outer ring portion interrupts said fluid circuit and directs fluid pressure to said core, between said rings, substantially reducing the drive of said turbine.

10. The device of claim 9 wherein said control means comprises a disc mounted on said free ends of the rods, an outer grooved annular extension on said disc, a sliding control ring received on said extension and mating therewith, a rocker arm pivotally mounted centrally thereof, externally of said fluid coupling, and operatively attached to said sliding ring, and power means secured to the free end of said rocker arm for moving said fluid diverting means through said rods to said operative and inoperative positions.

11. The device of claim 10 wherein said power means comprises a spring loaded hydraulic cylinder and an operating rod attached to the piston of said cylinder and to the free end of said rocker arm.

12. In a fluid coupling including semitoroidal bladed impeller, turbine, and reactor rotors, and exterior and interior shell means on each of said rotors defining a toroidal fluid circuit about a hollow, annular core, said bladed turbine being driven by fluid pressure supplied from said impeller, and said reactor rotor being disposed between the radially inward ends of said impeller and turbine rotors, fluid diverting means for interrupting said fluid circuit to reduce the drive of said turbine, located within said core in inoperative position, comprising radially spaced inner and outer baffle rings, a plurality of radial blades between said rings connecting the rings together, a first valve comprising a first annular valve face on said outer ring and an adjacent first annular valve seat on the inner shell of said impeller, a second valve including a second annular valve face on said inner ring and an adjacent second annular valve seat on the inner shell of said turbine, a portion of said outer ring being arranged for movement into said impeller to interrupt said fluid circuit, means for moving said outer ring portion into said impeller thereby moving said fluid diverter into operative position comprising at least two radially spaced rods, secured to said outer ring and mounted through said impeller, and control means at the free ends of said rods for moving said fluid diverting means to said operative and inoperative positions.

References Cited by the Examiner
UNITED STATES PATENTS

| 2,245,684 | 6/1941 | Kiep _____ | 60—54 |
| 2,358,473 | 9/1944 | Patterson _____ | 60—54 |
| 2,536,842 | 1/1951 | Duffield _____ | 60—54 |
| 2,658,346 | 11/1953 | Seybold _____ | 60—54 |
| 2,851,858 | 9/1958 | Grosskopf _____ | 60—54 |
| 2,894,370 | 7/1959 | Lewis _____ | 60—54 |
| 2,987,887 | 6/1961 | Fowler _____ | 60—54 |
| 3,150,492 | 9/1964 | Gsching _____ | 60—54 |

References Cited by the Applicant
UNITED STATES PATENTS

| 2,720,952 | 10/1955 | Alexandrescu. |
| 2,761,276 | 9/1956 | Kollmann. |
| 2,878,642 | 3/1959 | Maurice et al. |
| 2,882,684 | 4/1959 | Kelley. |

JULIUS E. WEST, *Primary Examiner.*